(12) United States Patent
Suciu et al.

(10) Patent No.: US 11,808,210 B2
(45) Date of Patent: Nov. 7, 2023

(54) INTERCOOLED COOLING AIR WITH HEAT EXCHANGER PACKAGING

(71) Applicant: United Technologies Corporation, Farmington, CT (US)

(72) Inventors: Gabriel L. Suciu, Glastonbury, CT (US); Jesse M. Chandler, South Windsor, CT (US); Brian D. Merry, Andover, CT (US); Nathan Snape, Tolland, CT (US)

(73) Assignee: RTX CORPORATION, Farmington, CT (US)

( * ) Notice: Subject to any disclaimer, the term of this patent is extended or adjusted under 35 U.S.C. 154(b) by 1181 days.

(21) Appl. No.: 15/978,517

(22) Filed: May 14, 2018

(65) Prior Publication Data

US 2018/0258860 A1 Sep. 13, 2018

Related U.S. Application Data

(63) Continuation-in-part of application No. 14/745,539, filed on Jun. 22, 2015, now Pat. No. 10,006,370, (Continued)

(51) Int. Cl.
*F02C 7/18* (2006.01)
*F02C 3/04* (2006.01)
(Continued)

(52) U.S. Cl.
CPC ............... *F02C 7/185* (2013.01); *F02C 3/04* (2013.01); *F02C 7/32* (2013.01); *F02C 9/18* (2013.01);
(Continued)

(58) Field of Classification Search
CPC .... F02C 7/185; F02C 9/18; F02C 7/32; F02C 6/08; F05D 2260/213; B64D 13/08
See application file for complete search history.

(56) References Cited

U.S. PATENT DOCUMENTS

| 2,692,476 A | 10/1954 | Schaal et al. |
| 3,878,677 A | 4/1975 | Colvin |

(Continued)

FOREIGN PATENT DOCUMENTS

| DE | 2852057 | 6/1979 | |
| DE | 102012208263 A1 * | 11/2013 | ................ F02C 6/08 |

(Continued)

OTHER PUBLICATIONS

Dornheim, Michael A., Rolls-Royce Trent 1000 to Drive Boeing 787 Accessories From IP Spool, Aviation Week & Space Technology, Mar. 28, 2005, p. 51, Los Angeles, CA.
U.S. Appl. No. 15/232,101, filed Aug. 9, 2016, Geared Turbofan with Low Spool Power Extraction.
U.S. Appl. No. 14/964,984, filed Dec. 10, 2015, Multi-Source Turbine Cooling Air.

(Continued)

*Primary Examiner* — Ehud Gartenberg
*Assistant Examiner* — Henry Ng
(74) *Attorney, Agent, or Firm* — Carlson, Gaskey & Olds, P.C.

(57) ABSTRACT

A gas turbine engine includes a plurality of rotating components housed within a compressor section and a turbine section. A tap connects to the compressor section. A heat exchanger connects downstream of the tap. A cooling compressor connects downstream of the heat exchanger, and the cooling compressor connects to deliver air to at least one of the rotating components. A core housing has an outer peripheral surface and a fan housing defines an inner peripheral surface. At least one bifurcation duct extends between the outer peripheral surface to the inner peripheral surface. The heat exchanger is disposed within the at least one bifurcation duct.

10 Claims, 6 Drawing Sheets

Related U.S. Application Data which is a continuation-in-part of application No. 14/695,578, filed on Apr. 24, 2015, now abandoned.

(60) Provisional application No. 62/115,578, filed on Feb. 12, 2015.

(51) Int. Cl.
  *F02C 7/32* (2006.01)
  *F02C 9/18* (2006.01)

(52) U.S. Cl.
  CPC .... *F05D 2220/323* (2013.01); *F05D 2240/90* (2013.01); *F05D 2260/213* (2013.01); *F05D 2260/4031* (2013.01)

(56) References Cited

U.S. PATENT DOCUMENTS

| | | | |
|---|---|---|---|
| 4,254,618 A | 3/1981 | Elovic | |
| 4,539,945 A | 9/1985 | Bosisio | |
| 4,542,623 A * | 9/1985 | Hovan | F01D 25/125 165/51 |
| 4,771,825 A * | 9/1988 | Chen | F28F 1/30 165/151 |
| 4,882,902 A | 11/1989 | Reigel et al. | |
| 5,056,335 A | 10/1991 | Renninger et al. | |
| 5,123,242 A | 6/1992 | Miller | |
| 5,269,135 A | 12/1993 | Vermejan et al. | |
| 5,305,616 A * | 4/1994 | Coffinberry | F02C 7/12 60/784 |
| 5,392,614 A | 2/1995 | Coffinberry | |
| 5,414,992 A | 5/1995 | Glickstein | |
| 5,452,573 A | 9/1995 | Glickstein et al. | |
| 5,498,126 A | 3/1996 | Pighetti et al. | |
| 5,724,806 A | 3/1998 | Horner | |
| 5,758,485 A | 6/1998 | Frutschi | |
| 5,867,979 A | 2/1999 | Newton et al. | |
| 5,918,458 A | 7/1999 | Coffinberry et al. | |
| 6,050,079 A | 4/2000 | Durgin et al. | |
| 6,065,282 A | 5/2000 | Fukue et al. | |
| 6,134,880 A | 10/2000 | Yoshinaka | |
| 6,430,931 B1 | 8/2002 | Horner | |
| 6,487,863 B1 | 12/2002 | Chen et al. | |
| 6,612,114 B1 | 9/2003 | Klingels | |
| 6,892,523 B2 | 5/2005 | Fetescu et al. | |
| 6,960,060 B2 * | 11/2005 | Lee | F01D 5/20 415/115 |
| 7,237,386 B2 | 7/2007 | Hoffmann et al. | |
| 7,246,484 B2 | 7/2007 | Giffin, III et al. | |
| 7,284,377 B2 | 10/2007 | Joshi et al. | |
| 7,306,424 B2 | 12/2007 | Romanov et al. | |
| 7,334,412 B2 | 2/2008 | Tiemann | |
| 7,347,637 B2 | 3/2008 | Kubo et al. | |
| 7,500,365 B2 | 3/2009 | Suciu et al. | |
| 7,552,591 B2 | 6/2009 | Bart et al. | |
| 7,698,884 B2 | 4/2010 | Maguire et al. | |
| 7,765,788 B2 | 8/2010 | Schwarz | |
| 7,823,389 B2 | 11/2010 | Seitzer et al. | |
| 7,882,691 B2 | 2/2011 | Lemmers, Jr. et al. | |
| 7,886,520 B2 | 2/2011 | Stretton et al. | |
| 8,015,828 B2 | 9/2011 | Moniz et al. | |
| 8,037,686 B2 | 10/2011 | Lasker | |
| 8,087,249 B2 | 1/2012 | Ottaviano et al. | |
| 8,181,443 B2 | 5/2012 | Rago | |
| 8,307,662 B2 | 11/2012 | Turco | |
| 8,350,398 B2 | 1/2013 | Butt | |
| 8,397,487 B2 | 3/2013 | Sennoun et al. | |
| 8,402,742 B2 | 3/2013 | Roberge et al. | |
| 8,434,997 B2 | 5/2013 | Pinero et al. | |
| 8,511,967 B2 | 8/2013 | Suciu et al. | |
| 8,522,529 B2 | 9/2013 | Martinou et al. | |
| 8,572,982 B2 | 11/2013 | Tiemann | |
| 8,602,717 B2 | 12/2013 | Suciu et al. | |
| 8,621,871 B2 | 1/2014 | McCune et al. | |
| 8,727,703 B2 | 5/2014 | Laurello et al. | |
| 8,776,952 B2 | 7/2014 | Schwarz et al. | |
| 8,814,502 B2 | 8/2014 | Eleftheriou | |
| 8,876,465 B2 | 11/2014 | Stretton | |
| 8,961,108 B2 | 2/2015 | Bergman et al. | |
| 9,194,330 B2 * | 11/2015 | Wood | F02K 3/075 |
| 9,234,481 B2 | 1/2016 | Suciu et al. | |
| 9,243,563 B2 | 1/2016 | Lo | |
| 9,255,492 B2 | 2/2016 | Bacic | |
| 9,297,391 B2 | 3/2016 | Rued et al. | |
| 9,422,063 B2 | 8/2016 | Diaz | |
| 9,429,072 B2 | 8/2016 | Diaz et al. | |
| 2003/0046938 A1 | 3/2003 | Mortzheim et al. | |
| 2004/0088995 A1 | 5/2004 | Reissig | |
| 2005/0172612 A1 | 8/2005 | Yamanaka et al. | |
| 2007/0022735 A1 | 2/2007 | Henry et al. | |
| 2007/0213917 A1 | 9/2007 | Bruno et al. | |
| 2007/0245738 A1 | 10/2007 | Stretton et al. | |
| 2008/0028763 A1 * | 2/2008 | Schwarz | F01D 25/12 60/771 |
| 2008/0230651 A1 | 9/2008 | Porte | |
| 2008/0253881 A1 | 10/2008 | Richards | |
| 2009/0007567 A1 | 1/2009 | Porte et al. | |
| 2009/0090096 A1 | 4/2009 | Sheridan | |
| 2009/0145102 A1 | 6/2009 | Roberge et al. | |
| 2009/0188232 A1 * | 7/2009 | Suciu | F02C 7/224 60/39.83 |
| 2009/0196736 A1 | 8/2009 | Sengar et al. | |
| 2009/0226297 A1 | 9/2009 | Yanagi et al. | |
| 2009/0272120 A1 | 11/2009 | Tiemann | |
| 2010/0005810 A1 | 1/2010 | Jarrell et al. | |
| 2010/0043396 A1 | 2/2010 | Coffinberry | |
| 2010/0154434 A1 | 6/2010 | Kubota et al. | |
| 2011/0036066 A1 | 2/2011 | Zhang et al. | |
| 2011/0088405 A1 | 4/2011 | Turco | |
| 2011/0120083 A1 | 5/2011 | Giffin et al. | |
| 2011/0247344 A1 | 10/2011 | Glahn et al. | |
| 2012/0067055 A1 | 3/2012 | Held | |
| 2012/0102915 A1 | 5/2012 | Baltas | |
| 2012/0159961 A1 | 6/2012 | Krautheim et al. | |
| 2012/0180509 A1 | 7/2012 | DeFrancesco | |
| 2013/0000317 A1 | 1/2013 | Berryann et al. | |
| 2013/0036747 A1 | 2/2013 | Fuchs et al. | |
| 2013/0067928 A1 | 3/2013 | Arias Chao et al. | |
| 2013/0098059 A1 | 4/2013 | Suciu et al. | |
| 2013/0145744 A1 | 6/2013 | Lo et al. | |
| 2013/0145774 A1 | 6/2013 | Duong et al. | |
| 2013/0186102 A1 | 7/2013 | Lo | |
| 2013/0199156 A1 | 8/2013 | Ress, Jr. et al. | |
| 2013/0239583 A1 | 9/2013 | Suciu et al. | |
| 2013/0319002 A1 | 12/2013 | Sidelkovskiy et al. | |
| 2014/0020506 A1 | 1/2014 | Duong | |
| 2014/0137417 A1 | 5/2014 | Silberberg et al. | |
| 2014/0196469 A1 | 7/2014 | Finney et al. | |
| 2014/0230444 A1 | 8/2014 | Hao et al. | |
| 2014/0250898 A1 | 9/2014 | Mackin et al. | |
| 2014/0260326 A1 | 9/2014 | Schwarz et al. | |
| 2014/0311157 A1 | 10/2014 | Laurello et al. | |
| 2014/0341704 A1 | 11/2014 | Fletcher | |
| 2014/0352315 A1 | 12/2014 | Diaz | |
| 2015/0114611 A1 | 4/2015 | Morris et al. | |
| 2015/0285147 A1 | 10/2015 | Phillips et al. | |
| 2015/0308339 A1 | 10/2015 | Forcier | |
| 2015/0330236 A1 | 11/2015 | Beecroft et al. | |
| 2015/0354465 A1 | 12/2015 | Suciu et al. | |
| 2015/0354822 A1 | 12/2015 | Suciu et al. | |
| 2016/0010554 A1 | 1/2016 | Suciu et al. | |
| 2016/0131036 A1 | 5/2016 | Bintz et al. | |
| 2016/0131037 A1 | 5/2016 | Spangler et al. | |
| 2016/0169118 A1 | 6/2016 | Duong | |
| 2016/0215732 A1 | 7/2016 | Malecki | |
| 2016/0237906 A1 * | 8/2016 | Suciu | F02C 7/18 |
| 2016/0312797 A1 | 10/2016 | Suciu et al. | |
| 2016/0341125 A1 | 11/2016 | Kraft et al. | |
| 2016/0369697 A1 | 12/2016 | Schwarz et al. | |
| 2017/0009657 A1 | 1/2017 | Schwarz et al. | |
| 2017/0044980 A1 | 2/2017 | Duesler et al. | |
| 2017/0044982 A1 | 2/2017 | Duesler et al. | |
| 2017/0152765 A1 | 6/2017 | Uechi et al. | |

(56) References Cited

U.S. PATENT DOCUMENTS

| | | | |
|---|---|---|---|
| 2017/0159490 A1* | 6/2017 | Sennoun | F02C 7/06 |
| 2017/0159568 A1 | 6/2017 | Sennoun et al. | |
| 2017/0167388 A1 | 6/2017 | Merry et al. | |
| 2017/0175632 A1 | 6/2017 | Hanrahan et al. | |
| 2017/0184027 A1 | 6/2017 | Moniz et al. | |
| 2017/0204787 A1 | 7/2017 | Duesler et al. | |
| 2017/0307311 A1 | 10/2017 | Schwarz et al. | |
| 2019/0277195 A1* | 9/2019 | Cerra | B64D 13/06 |

FOREIGN PATENT DOCUMENTS

| | | |
|---|---|---|
| EP | 0447886 | 9/1991 |
| EP | 0469825 | 2/1992 |
| EP | 0608142 | 7/1994 |
| EP | 0903484 | 3/1999 |
| EP | 1314872 | 5/2003 |
| EP | 1876328 A2 | 1/2008 |
| EP | 1944475 | 7/2008 |
| EP | 2085599 | 8/2009 |
| EP | 2128023 | 12/2009 |
| EP | 2362081 | 8/2011 |
| EP | 2540991 | 1/2013 |
| EP | 2584172 | 4/2013 |
| EP | 2604825 | 6/2013 |
| EP | 2733322 | 5/2014 |
| EP | 2865981 | 4/2015 |
| EP | 2942490 | 11/2015 |
| EP | 3085923 | 10/2016 |
| EP | 3085924 | 10/2016 |
| EP | 3109435 A1 | 12/2016 |
| EP | 3121411 | 1/2017 |
| FR | 2851295 | 8/2004 |
| GB | 1244340 | 8/1971 |
| GB | 2152148 | 7/1985 |
| JP | H1136889 | 2/1999 |
| WO | 2003037715 | 5/2003 |
| WO | 2008082335 | 7/2008 |
| WO | 2013154631 | 10/2013 |
| WO | 2014046713 | 3/2014 |
| WO | 2014092777 | 6/2014 |
| WO | 2014120125 | 8/2014 |

OTHER PUBLICATIONS

U.S. Appl. No. 14/967,446, filed Dec. 14, 2015, Intercooled Cooling Air with Auxiliary Compressor Control.
U.S. Appl. No. 15/069,197, filed Mar. 14, 2016, Intercooled Cooling Air Using Existing Heat Exchanger.
U.S. Appl. No. 15/269,014, filed Sep. 19, 2016, Gas Turbine Engine with Intercooled Dooling Air and Turbine Drive.
U.S. Appl. No. 15/373,072, filed Dec. 8, 2016, Twin Shafts Driving Adjacent Fans for Aircraft Propulsion.
European Search Report for EP Application No. 16166707.6 dated Sep. 26, 2016.
European Search Report for EP Application No. 16166724.1 dated Sep. 26, 2016.
European Search Report for EP Application No. 16154635.3 dated Jul. 6, 2016.
European Search Report for EP Application No. 16155316.9 dated Jun. 30, 2016.
European Search Report for EP Application No. 16170021.6 dated Oct. 18, 2016.
European Search Report for EP Application No. 16174862.9 dated Nov. 14, 2016.
European Search Report for EP Application No. 17160816.9 dated Jul. 21, 2017.
European Search Report for EP Application No. 16175533.5 dated Nov. 15, 2016.
European Search Report for EP Application No. 16175552.5 dated Nov. 17, 2016.
European Search Report for EP Application No. 16175760.4 dated Nov. 16, 2016.
European Search Report for EP Application No. 16178207.3 dated Nov. 30, 2016.
European Search Report for EP Application No. 16202876.5 dated Apr. 24, 2017.
European Search Report for EP Application No. 16180657.5 dated Dec. 16, 2016.
Extended European Search Report for EP Application No. 16175531.9, dated Nov. 15, 2016.
European Search Report for EP Application No. 19173765.9 dated Sep. 27, 2019.

* cited by examiner

INTERCOOLED COOLING AIR WITH HEAT EXCHANGER PACKAGING

CROSS-REFERENCE TO RELATED APPLICATION

This application is a continuation-in-part of U.S. patent application Ser. No. 14/745,539, filed Jun. 22, 2015, now U.S. Pat. No. 10,006,370 granted on Jun. 26, 2018, which is a continuation-in-part of U.S. patent application Ser. No. 14/695,578, filed on Apr. 24, 2015, and claims priority to U.S. Provisional Patent Application No. 62/115,578, filed Feb. 12, 2015.

BACKGROUND

This application relates to improvements in providing cooling air from a compressor section to a turbine section in a gas turbine engine.

Gas turbine engines are known and typically include a fan delivering air into a bypass duct as propulsion air. Further, the fan delivers air into a compressor section where it is compressed. The compressed air passes into a combustion section where it is mixed with fuel and ignited. Products of this combustion pass downstream over turbine rotors driving them to rotate.

It is known to provide cooling air from the compressor to the turbine section to lower the operating temperatures in the turbine section and improve overall engine operation. Typically, air from the high compressor discharge has been tapped, passed through a heat exchanger, which may sit in the bypass duct and then delivered into the turbine section. The air from the downstream most end of the compressor section is at elevated temperatures.

SUMMARY

In a featured embodiment, a gas turbine engine includes a plurality of rotating components housed within a compressor section and a turbine section. A tap connects to the compressor section. A heat exchanger connects downstream of the tap. A cooling compressor connects downstream of the heat exchanger, and the cooling compressor connects to deliver air to at least one of the rotating components. A core housing has an outer peripheral surface and a fan housing defines an inner peripheral surface. At least one bifurcation duct extends between the outer peripheral surface to the inner peripheral surface. The heat exchanger is disposed within the at least one bifurcation duct.

In another embodiment according to the previous embodiment, air is delivered into a heat exchanger first leg within the core housing. The first leg extends outwardly of the core housing and into the at least one bifurcation duct, and to a second leg extending back toward a center axis of the engine, and back into the core housing to deliver the air to the cooling compressor.

In another embodiment according to any of the previous embodiments, the second leg is positioned to be upstream of the first leg relative to a flow of bypass air between the core housing and the fan housing.

In another embodiment according to any of the previous embodiments, there are a plurality of first legs and a plurality of second legs.

In another embodiment according to any of the previous embodiments, the plurality of first legs and the plurality of second legs communicate with a common header to turn air from the first leg to the second leg.

In another embodiment according to any of the previous embodiments, the first and second legs are provided with structure to increase a cross-sectional surface area of an outer peripheral surface of the first and second legs.

In another embodiment according to any of the previous embodiments, the turbine section drives a gear. The gear further drives the cooling compressor.

In another embodiment according to any of the previous embodiments, the gear also drives an accessory gearbox.

In another embodiment according to any of the previous embodiments, there is an upper bifurcation and a lower bifurcation, and the heat exchanger is in the upper bifurcation.

In another embodiment according to any of the previous embodiments, there is an upper bifurcation and a lower bifurcation, and the heat exchanger is in the lower bifurcation.

In another embodiment according to any of the previous embodiments, the bifurcations extend generally to sides of the core housing and the fan housing and the heat exchanger is in one of the bifurcations.

In another embodiment according to any of the previous embodiments, there is an air inlet for air to pass over the heat exchanger in the at least one bifurcation duct and an air outlet.

In another embodiment according to any of the previous embodiments, there is a valve in at least one of the air inlet and air outlet.

In another embodiment according to any of the previous embodiments, the valve is in the air inlet.

In another embodiment according to any of the previous embodiments, the valve has a pair of flaps which can pivot outwardly to a closed position and pivot toward each other to an open position, and the control controls the position of said flaps.

In another embodiment according to any of the previous embodiments, the valve is mounted in the air outlet.

In another embodiment according to any of the previous embodiments, the valve includes a flap valve pivoting between a position at which it extends outwardly into a bypass duct and to a closed position at which it blocks flow through the outlet.

In another featured embodiment, a gas turbine engine includes a plurality of rotating components housed within a compressor section and a turbine section. A tap taps air connected to the compressor section. A heat exchanger connects downstream of the tap, and to a cooling compressor connected downstream of the heat exchanger. The cooling compressor connects to deliver air to at least one of the rotating components. A core housing having an outer peripheral surface and a fan housing defines an inner peripheral surface. At least one bifurcation duct extends between the outer peripheral surface to the inner peripheral surface. The heat exchanger is disposed within the at least one bifurcation duct. The heat exchanger includes a plurality of heat exchanger first legs within the core housing. The first legs extend outwardly of the core housing and into the at least one bifurcation duct, and to a plurality of heat exchanger second legs extending back toward a center axis of the engine, and back into the core housing to deliver the air to the cooling compressor. The second legs are positioned to be upstream of the first legs relative to a flow of bypass air between the core housing and the fan housing. The plurality of first legs and the plurality of second legs communicate with a common header to turn air from the first legs to the second legs. The first and second legs are provided with structure to increase a cross-sectional surface area of an outer peripheral surface of the first and second legs. The turbine section drives a gear. The gear further drives the cooling compressor. The gear also drives an accessory gearbox. There is an air inlet for air to pass over the heat exchanger in the at least one bifurcation duct and an air outlet, and a valve in at least one of the air inlet and air outlet.

In another embodiment according to the previous embodiment, the valve is in the air inlet.

In another embodiment according to the previous embodiment, the valve is mounted in the air outlet.

These and other features may be best understood from the following drawings and specification.

DETAILED DESCRIPTION

Figure 1:
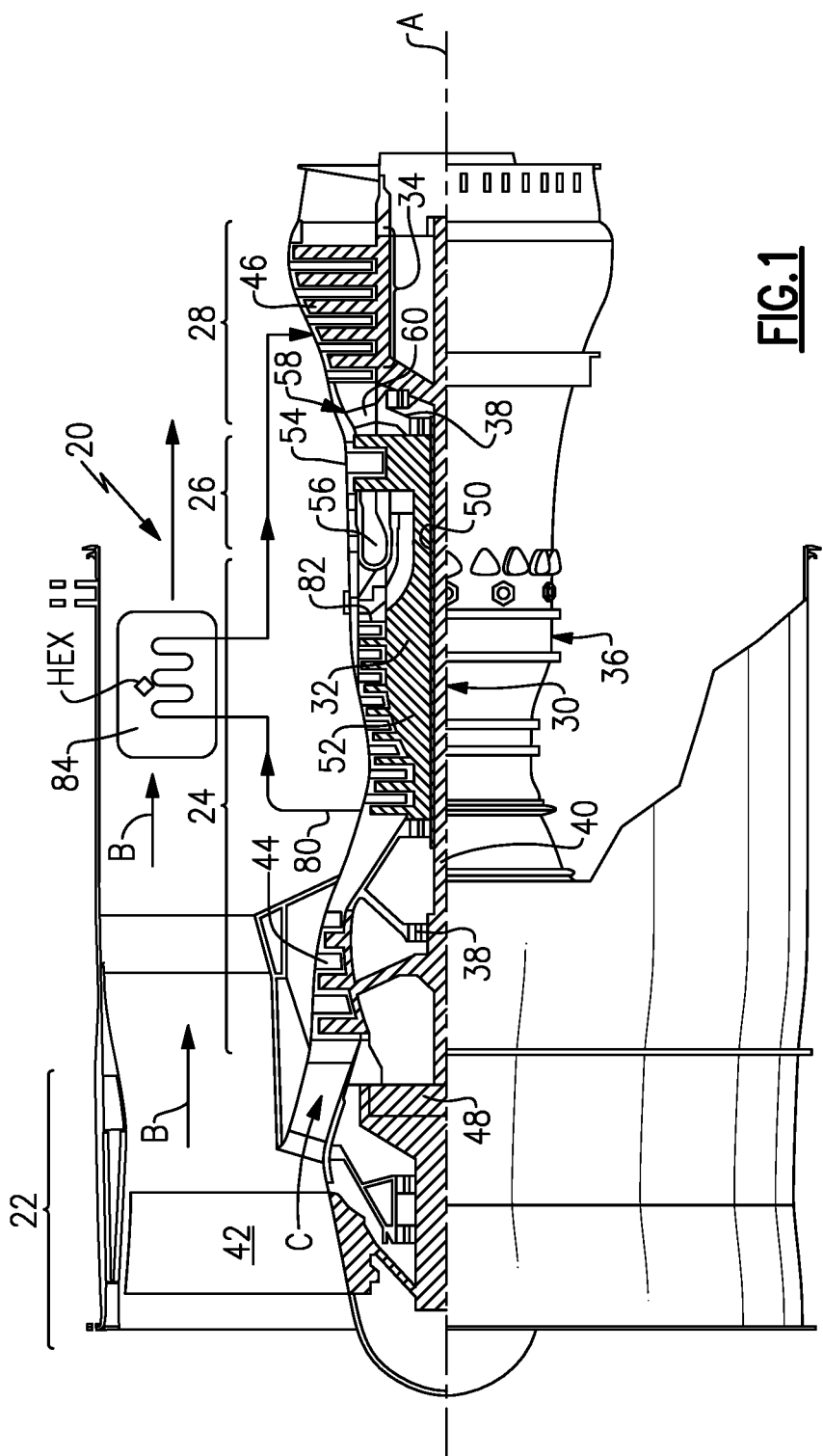
FIG. 1 schematically shows an embodiment of a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Gas turbine engines designs are seeking to increase overall efficiency by generating higher overall pressure ratios. By achieving higher overall pressure ratios, increased levels of performance and efficiency may be achieved. However, challenges are raised in that the parts and components associated with a high pressure turbine require additional cooling air as the overall pressure ratio increases.

The example engine 20 utilizes air bleed 80 from an upstream portion of the compressor section 24 for use in cooling portions of the turbine section 28. The air bleed is from a location upstream of the discharge 82 of the compressor section 24. The bleed air passes through a heat exchanger 84 to further cool the cooling air provided to the turbine section 28. The air passing through heat exchanger 84 is cooled by the bypass air B. That is, heat exchanger 84 is positioned in the path of bypass air B.

Figure 2:
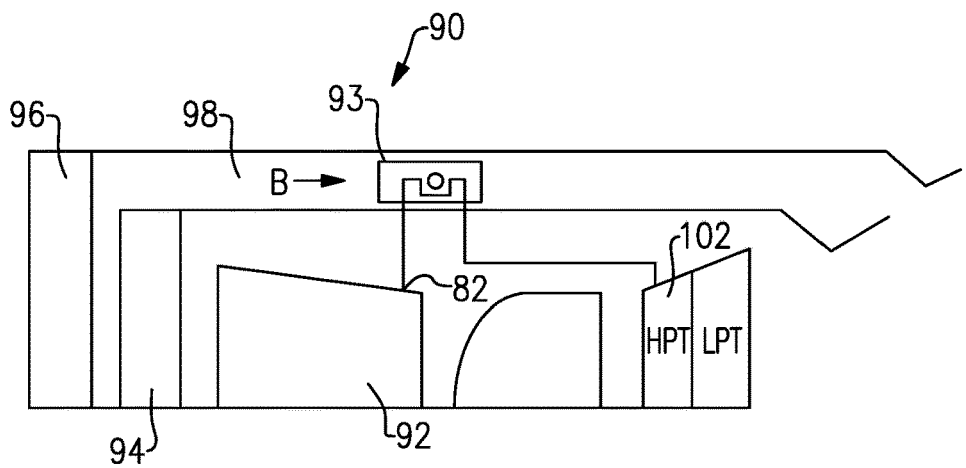
FIG. 2 shows a prior art engine.

A prior art approach to providing cooling air is illustrated in FIG. 2. An engine 90 incorporates a high pressure compressor 92 downstream of the low pressure compressor 94. As known, a fan 96 delivers air into a bypass duct 98 and into the low pressure compressor 94. A downstream most point, or discharge 82 of the high pressure compressor 92 provides bleed air into a heat exchanger 93. The heat exchanger is in the path of the bypass air in bypass duct 98, and is cooled. This high pressure high temperature air from location 82 is delivered into a high pressure turbine 102.

The downstream most point 82 of the high pressure compressor 92 is known as station 3. The temperature T3 and pressure P3 are both very high.

In future engines, T3 levels are expected to approach greater than or equal to 1350° F. Current heat exchanger technology is becoming a limiting factor as they are made of materials, manufacturing, and design capability which have difficulty receiving such high temperature and pressure levels.

Figure 3A:
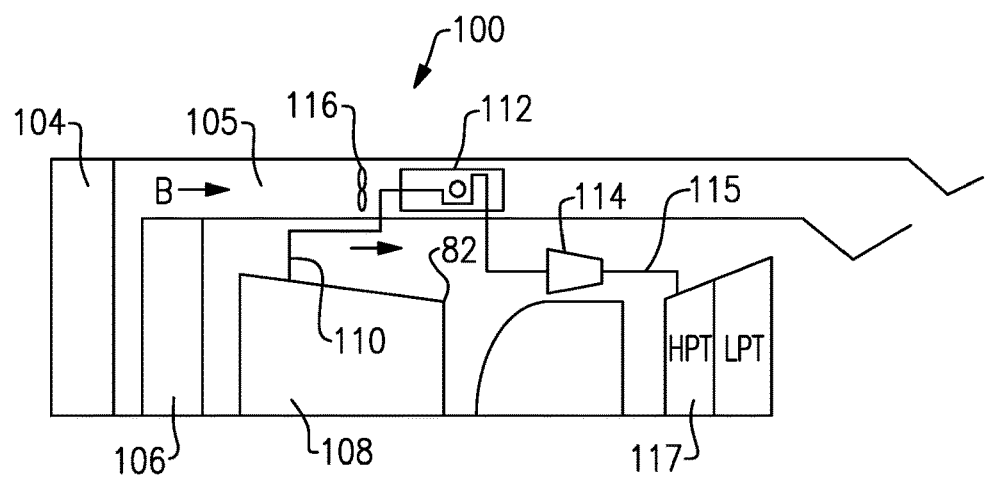
FIG. 3A shows one example engine.

FIG. 3A shows an engine 100 coming within the scope of this disclosure. A fan 104 may deliver air B into a bypass duct 105 and into a low pressure compressor 106. High pressure compressor 108 is positioned downstream of the low pressure compressor 106. A bleed 110 taps air from a location upstream of the downstream most end 82 of the high pressure compressor 108. This air is at temperatures and pressures which are much lower than T3/P3. The air tapped at 110 passes through a heat exchanger 112 which sits in the bypass duct 105 receiving air B. Further, the air from the heat exchanger 112 passes through a compressor 114, and then into a conduit 115 leading to a high turbine 117. This structure is all shown schematically.

Since the air tapped at point 110 is at much lower pressures and temperatures than the FIG. 2 prior art, currently available heat exchanger materials and technology may be utilized. This air is then compressed by compressor 114 to a higher pressure level such that it will be able to flow into the high pressure turbine 117.

An auxiliary fan 116 may be positioned upstream of the heat exchanger 112 as illustrated. The main fan 104 may not provide sufficient pressure to drive sufficient air across the heat exchanger 112. The auxiliary fan will ensure there is adequate airflow in the circumferential location of the heat exchanger 112. The auxiliary fan 116 may allow the heat exchanger to be made smaller.

In one embodiment, the auxiliary fan may be variable speed, with the speed of the fan varied to control the temperature of the air downstream of the heat exchanger 112. As an example, the speed of the auxiliary fan may be varied based upon the operating power of the overall engine.

Figure 3B:
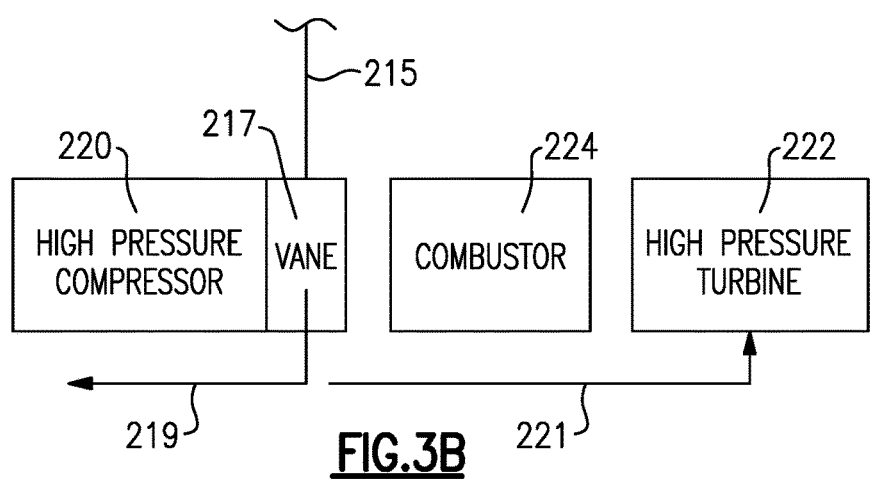
FIG. 3B shows a detail.

FIG. 3B shows an alternative system. In FIG. 3B, air, at 215, downstream of the cooling compressor 114, may be delivered through a vane 217 which is part of a diffuser downstream of a high pressure compressor 220. The air is shown moving at 219 to cool the high pressure compressor 220. Optionally, the air at 221 is delivered to cool the high pressure turbine 222. An intermediate combustor 224 is shown. In embodiments, the air may flow to both 219 and 221, or either. Generically, the airflow downstream of the cooling compressor cools a rotating component, which may be the high pressure compressor, or the high pressure turbine.

If the compressor is cooled, this cooling air will reduce metal temperature arising from the compression process. It is known that the pressures and temperatures seen by the high pressure compressor raises challenges at elevated temperatures and because of thermal gradients as the pressures and temperatures increase. Providing the cooling air at 219 to the rear section of the high pressure compressor cools disks and hubs in the high pressure compressor, beneficially.

Figure 4:
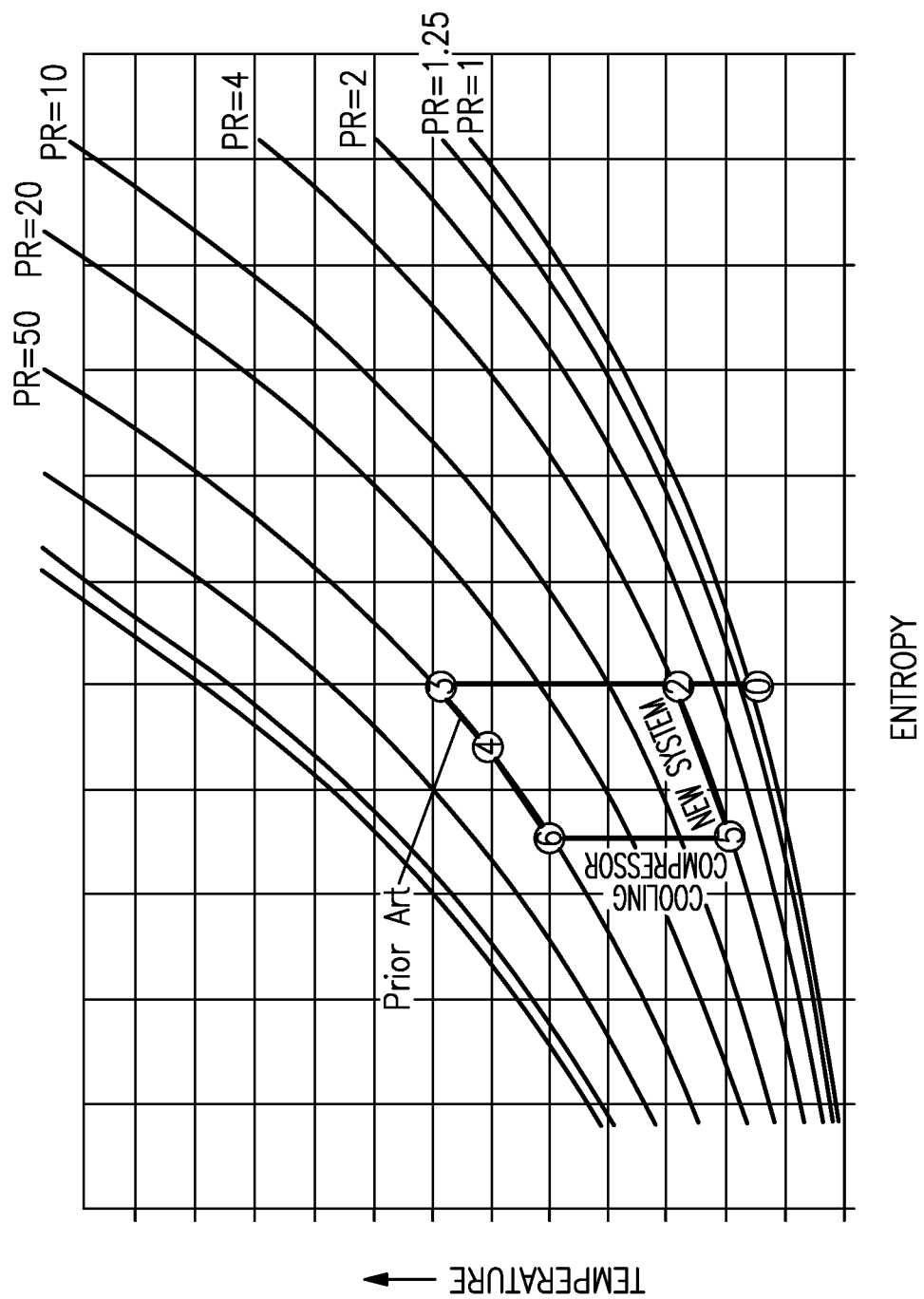
FIG. 4 is a graph illustrating increasing temperatures of a tapped air against the work required.

Referring to FIG. 4, a temperature/entropy diagram illustrates that a lower level of energy is spent to compress air of a lower temperature to the desired P3 pressure level. Cooler air requires less work to compress when compared to warmer air. Accordingly, the work required to raise the pressure of the air drawn from an early stage of the compressor section is less than if the air were compressed to the desired pressure within the compressor section. Therefore, high pressure air at P3 levels or higher can be obtained at significantly lower temperatures than T3. As shown in FIG. 4, to reach a particular pressure ratio, 50 for example, the prior system would move from point 2 to point 3, with a dramatic increase in temperature. However, the disclosed or new system moves from point 2 to point 5 through the heat exchanger, and the cooling compressor then compresses the air up to point 6. As can be appreciated, point 6 is at a much lower temperature.

Figure 5:
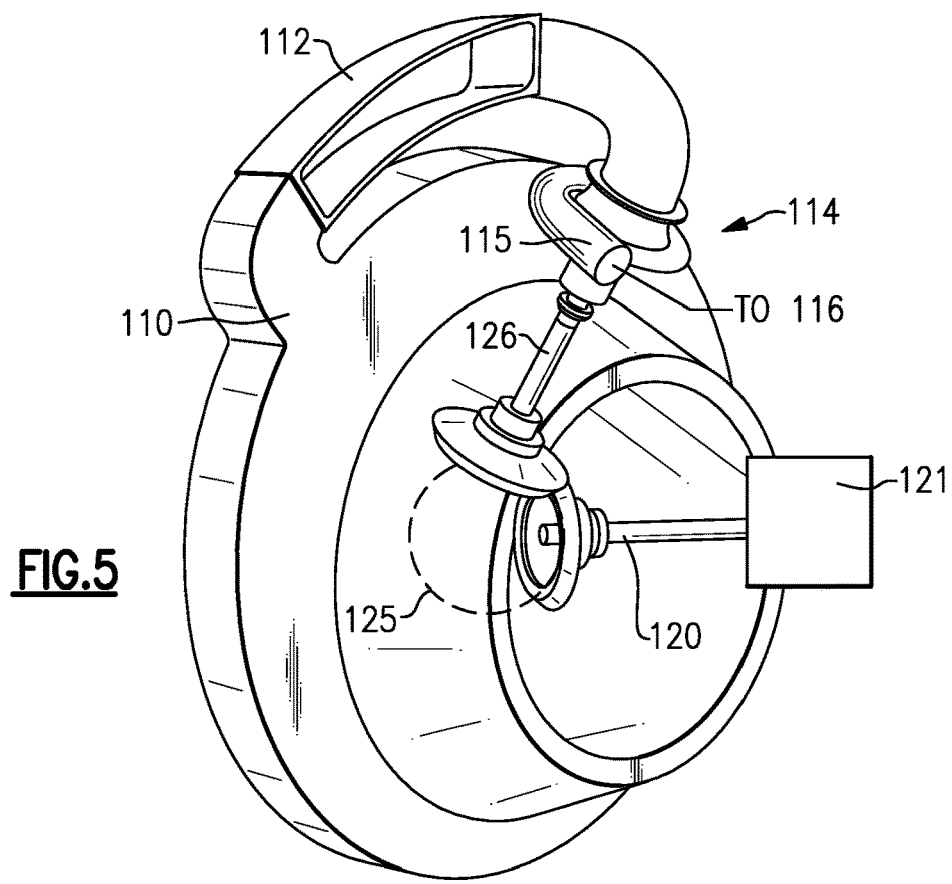
FIG. 5 shows a detail of an example of an engine.

FIG. 5 shows a detail of compressor 114 having an outlet into conduit 115. A primary tower shaft 120 drives an accessory gearbox 121. The shaft 126 drives a compressor rotor within the compressor 114. The shafts 120 and 126 may be driven by a bull gear 125 driven by a turbine rotor, and in one example, with a high pressure compressor rotor.

Figure 6:
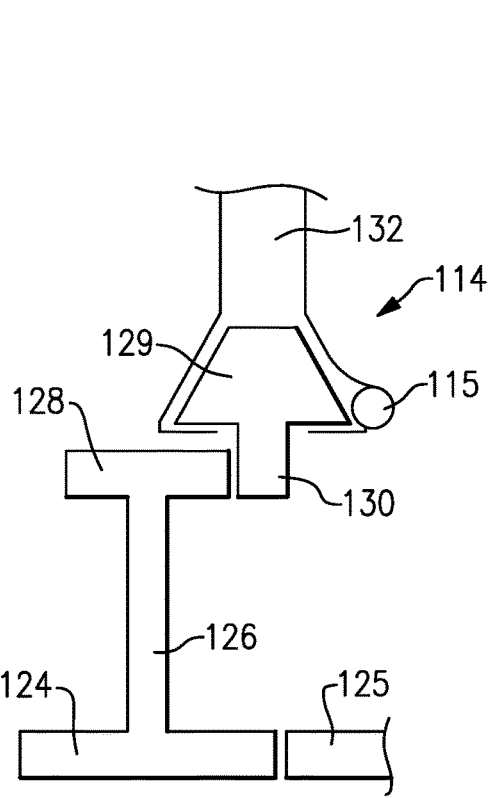
FIG. 6 shows a further detail of the example engine of FIG. 5.

FIG. 6 shows an example wherein a gear 128 is driven by the shaft 126 to, in turn, drive a gear 130 which drives a compressor impeller 129. An input 132 to the compressor impeller 129 supplies the air from the tap 110. The air is compressed and delivered into the outlet conduit 115.

By providing a gear ratio increase between the compressor impeller 129 and the high spool bull gear 125, the compressor impeller may be driven to operate an optimum speed. As an example, the gear increase may be in a range of 5:1-8:1, and in one embodiment, 6:1.

Details of the engine, as set forth above, may be found in co-pending U.S. patent application Ser. No. 14/695,578, which is incorporated herein by reference in its entirety.

Figure 7A:
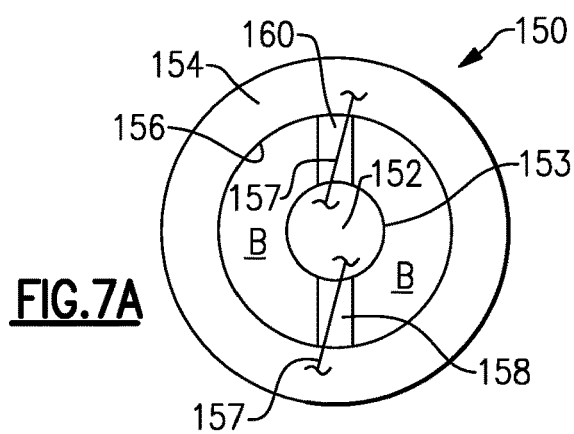
FIG. 7A schematically shows a feature of example engine of FIG. 5.

FIG. 7A shows a feature of gas turbine engine 150. A core housing 152 is shown having a radially outer surface 153. A nacelle or fan housing 154 has a radially inner surface 156. A bypass duct receiving bypass air B is defined between the surfaces 153 and 156. As known, elements, such as electronic or hydraulic connections (157, shown schematically), must extend between the housings 152 and 154. Thus, so-called bifurcation ducts 158 and 160 are formed between the two housings. Bifurcation duct 158 would be at a vertically lower location while bifurcation duct 160 would be at a vertically upper location when the engine is mounted on an aircraft.

Figure 7B:
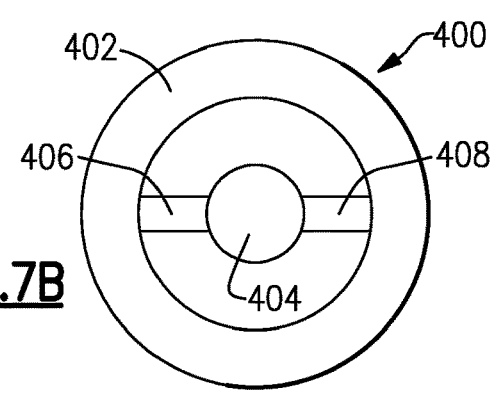
FIG. 7B shows an alternative position.

FIG. 7B shows an alternative bifurcation duct arrangement 400. Fan housing 402 surrounds the core engine 404. Bifurcations 406 and 408 extend generally at 3:00 o'clock and 9:00 o'clock directions as opposed to the 6:00/12:00 o'clock directions of FIG. 7A. FIG. 7A embodiment may be utilized if an engine is mounted on a wing, whereas, the FIG. 7B embodiment may be utilized for fuselage mounted engines.

The teachings of this disclosure could extend to packaging a heat exchanger in any of these four locations.

A challenge with the engine defined in FIGS. 1 and 6 is that placing the heat exchanger in the path of the bypass air blocks the airflow somewhat. There is already blockage from the bifurcation ducts. Thus, the additional blockage may be undesirable for some applications.

Figure 8A:
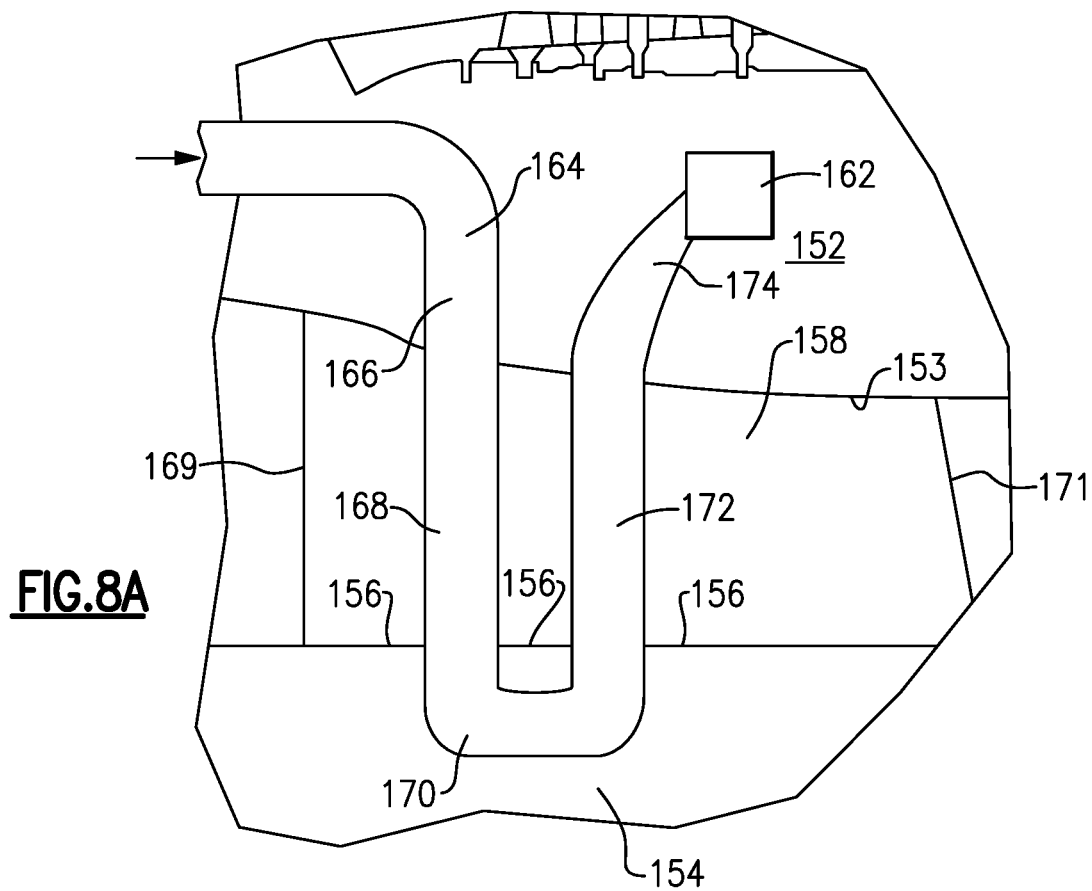
FIG. 8A shows a detail of the example engine of FIG. 5.

As shown in FIG. 8A, the heat exchanger 164 has a first leg portion 166 received within the housing 152, and extending to a leg portion 168 within the bifurcation duct 158. A turning portion 170 is actually outward of the surface 156 and within the fan housing 154. The turning portion 170 returns the flow into a second leg 172, which extends back radially toward a center of the engine to an outlet 174. Outlet 174 communicates downstream to the cooling compressor 162, which is also within the core housing.

Stated in one way, air is delivered into a heat exchanger first leg 168 within the core housing. The leg extends outwardly of the core housing and into the at least one bifurcation duct 158, and to a second leg 172 extending back toward a center axis of the engine, and back into the core housing to deliver the air to a cooling compressor 162.

The heat exchanger 164 can be said to communicate air from within core housing 152, into bifurcation duct 158, then into fan housing 154. The air then flows back inwardly into bifurcation duct 158, the core housing 152 and to a high pressure turbine.

FIG. 8A also shows an upstream end 169 and downstream end 171 of the bifurcation duct which receives the heat exchanger.

Figure 8B:
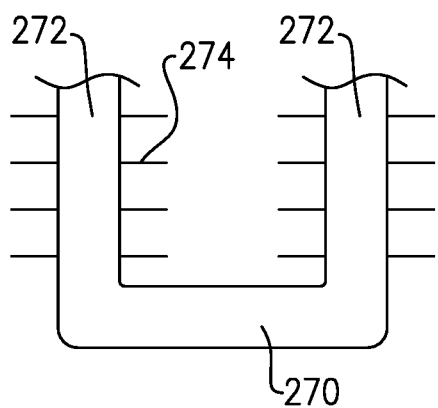
FIG. 8B shows a further optional detail.

FIG. 8B discloses an embodiment wherein there are a plurality of legs 272 extending through the bifurcation duct to the turning portion 270. In this embodiment, the legs 272 may be discrete heat exchanger bodies leading into a common header 270. It should be understood that if the legs 272 are the inlets, there may also be a plurality of similar outlets. In addition, fins 274 are shown schematically to increase the effective area of the outer surface of the legs 272. Any number of other ways of increasing the surface area may be utilized.

Figure 8C:
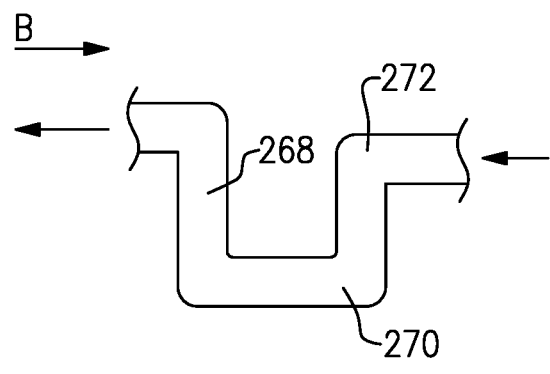
FIG. 8C shows a further optional detail.

FIG. 8C shows an embodiment wherein the inlet 272 leads to the turning portion 270, and then to the outlet 268. As illustrated by the bypass flow B, the outlet leg 268 is upstream of the inlet leg 272. In this manner, the air passing across leg 268 has not been heated by the hotter air in leg 272.

Figure 9:
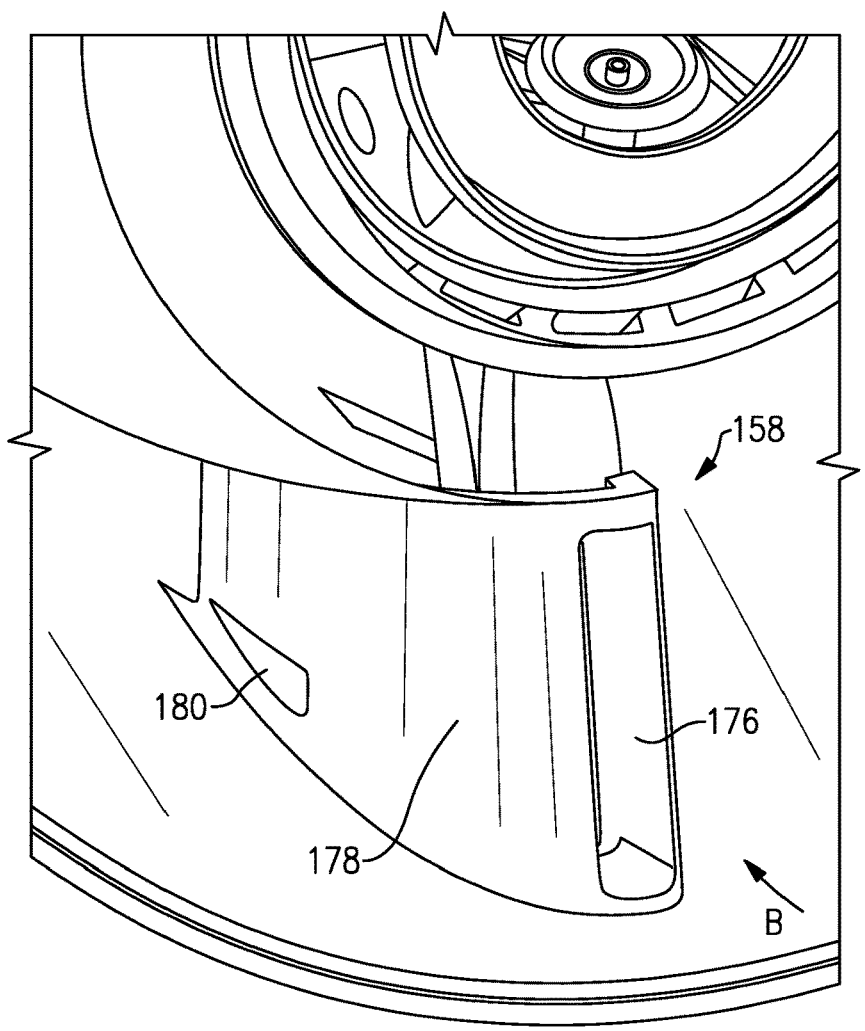
FIG. 9 shows a further detail of the example engine of FIG. 5.

FIG. 9 shows the bifurcation duct 158 having side walls 178. In the prior art, the bifurcation duct need not allow airflow. However, once the heat exchanger 164 is mounted within the bifurcation duct, air desirably passes over the heat exchanger. Thus, an enlarged opening 176 is formed on an upstream end and one or more outlets 180 are formed on a downstream end.

By placing the heat exchanger within the bifurcation duct, the restriction to flow caused by the inclusion of the heat exchanger is dramatically reduced.

Figure 10A:
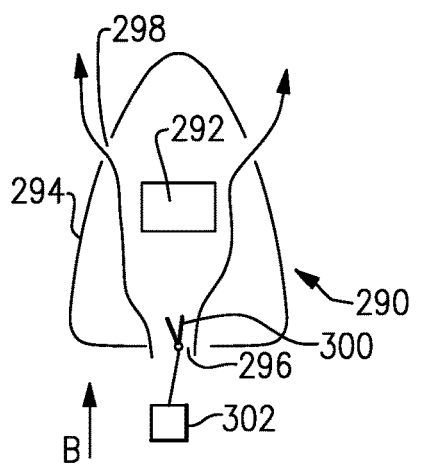
FIG. 10A shows a valve arrangement in a first position.

FIG. 10A shows a bifurcation embodiment 290 having a heat exchanger 292. A body 294 includes a forward inlet 296, similar to inlet 276, and rear outlets 298, similar to outlet 180. As shown, a valve 300 is open in this position to the inlet 296 and through the outlets 298. A control 302 can control the valve.

Figure 10B:
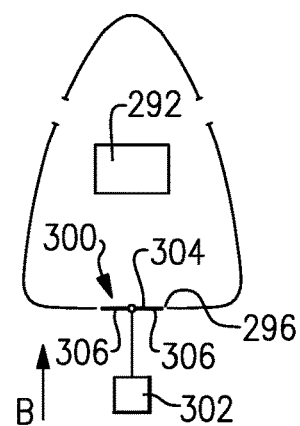
FIG. 10B shows a FIG. 10A valve in a distinct position.

As shown in FIG. 10B, control 302 has now moved flaps 306 on the valve 300 to a closed position at which it blocks flow into the inlet. This will occur when further cooling of the heat exchanger 292 is not needed. This will provide more efficient use of the bypass air as the bypass air will not be directed into the bifurcation duct when cooling is not necessary.

Figure 11:
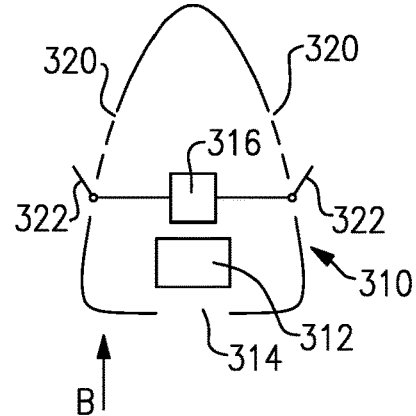
FIG. 11 shows another valve embodiment.

FIG. 11 shows an embodiment 310 wherein a heat exchanger 312 is positioned within the bifurcation duct. The inlet 314 does not receive a valve, but rather the outlets 320 receives the valve 322. In this embodiment, the control 316 pivots the valves 322 as flaps between the illustrated open position, at which airflow is allowed, into a closed position, shown in phantom, at which airflow is prevented. This would operate in a similar manner to the FIG. 10A/10B embodiment.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
a plurality of rotating components housed within a compressor section and a turbine section;
a tap connected to said compressor section, said compressor section having a downstream most location and locations upstream of said downstream most location, said tap tapping air from one of said locations upstream of said downstream most location such that air in said tap is at a lower pressure than the air downstream of the downstream most location, a heat exchanger connected downstream of said tap, and a cooling compressor connected downstream of said heat exchanger, and said cooling compressor connected to deliver air to at least one of said rotating components;
a core housing having an outer peripheral surface and a fan housing defining an inner peripheral surface, at least one bifurcation duct extending between said outer peripheral surface to said inner peripheral surface, and said heat exchanger disposed within said at least one bifurcation duct;
an air inlet for air to pass over said heat exchanger in said at least one bifurcation duct and an air outlet;
wherein there is a valve in said air outlet; and
a control moving said valve between an open position at which it allows air to flow from the inlet to the outlet and to a closed position at which it prevents flow passing from said inlet to said outlet;
wherein air is delivered into a first leg within said core housing, the first leg extending outwardly of said core housing and into said at least one bifurcation duct, and to a second leg extending back toward a center axis of the engine, and back into said core housing to deliver the air to said cooling compressor; and
wherein said second leg is positioned to be upstream of said first leg relative to a flow of bypass air between said core housing and said fan housing.

2. The gas turbine engine as set forth in claim 1, wherein there are a plurality of said first leg and a plurality of said second leg.

3. The gas turbine engine as set forth in claim 1, wherein said first leg and the second leg are provided with structure to increase a cross-sectional surface area of an outer peripheral surface of said first leg and said second leg.

4. The gas turbine engine as set forth in claim 1, wherein said turbine section drives a gear, said gear further driving said cooling compressor.

5. The gas turbine engine as set forth in claim 4, wherein said gear also drives an accessory gearbox.

6. The gas turbine engine as set forth in claim 1, wherein there is an upper bifurcation and a lower bifurcation, and wherein said heat exchanger is in said upper bifurcation.

7. The gas turbine engine as set forth in claim 1, wherein there is an upper bifurcation and a lower bifurcation, and wherein said heat exchanger is in said lower bifurcation.

8. The gas turbine engine as set forth in claim 1, wherein said valve has a pair of flaps which can pivot outwardly to a closed position and pivot toward each other to an open position, and the control controlling the position of said flaps.

9. The gas turbine engine as set forth in claim 1, wherein said valve includes a flap valve pivoting between a position at which it extends outwardly into a bypass duct and to a closed position at which it blocks flow through said outlet.

10. A gas turbine engine comprising:
a plurality of rotating components housed within a compressor section and a turbine section;
a tap connected to said compressor section, said compressor section having a downstream most location and locations upstream of said downstream most location, said tap tapping air from one of said locations upstream of said downstream most location such that air in said tap is at a lower pressure than the air downstream of the downstream most location, a heat exchanger connected downstream of said tap, and to a cooling compressor connected downstream of said heat exchanger, and said cooling compressor connected to deliver air to at least one of said rotating components;
a core housing having an outer peripheral surface and a fan housing defining an inner peripheral surface, at least one bifurcation duct extending between said outer peripheral surface to said inner peripheral surface, and said heat exchanger disposed within said at least one bifurcation duct;
said heat exchanger including a plurality of first legs within said core housing, the first legs extending outwardly of said core housing and into said at least one bifurcation duct, and to a plurality of second legs extending back toward a center axis of the engine, and back into said core housing to deliver the air to said cooling compressor;
said second legs are positioned to be upstream of said first legs relative to a flow of bypass air between said core housing and said fan housing;
said first legs and the second legs are provided with structure to increase a cross-sectional surface area of an outer peripheral surface of said first legs and second legs, said turbine section driving a gear, said gear further driving said cooling compressor, said gear also driving an accessory gearbox; and
there is an air inlet for air to pass over said heat exchanger in said at least one bifurcation duct and an air outlet, and a valve in said air outlet, and a control moving said valve between an open position at which it allows air to flow from the air inlet to the air outlet and to a closed position at which it prevents flow passing from said air inlet to said air outlet.

* * * * *